United States Patent [19]

Lederman

[11] Patent Number: 5,152,726
[45] Date of Patent: Oct. 6, 1992

[54] SHIFTABLE ROLLER CLUTCH

[75] Inventor: Frederick E. Lederman, Sandusky, Ohio

[73] Assignee: General Motors Corporation, Detroit, Mich.

[21] Appl. No.: 724,294

[22] Filed: Jul. 1, 1991

[51] Int. Cl.⁵ .................. F16H 57/10; F16H 1/28; F16D 15/00; F16D 23/12

[52] U.S. Cl. .................. 475/324; 192/27; 192/45; 192/47; 188/82.3; 188/82.34; 188/82.84

[58] Field of Search .............. 192/45, 47, 27; 475/281, 283, 285, 287, 289, 291, 292, 297, 307, 312, 318, 324, 269; 188/82.3, 82.34, 82.84

[56] References Cited

U.S. PATENT DOCUMENTS

| 1,843,194 | 2/1932 | Banker | 475/324 X |
| 2,504,481 | 4/1950 | Zingsheim | 192/45 |
| 2,552,000 | 5/1951 | DuBois | 475/324 X |
| 3,054,488 | 9/1962 | General et al. | 192/44 |
| 3,084,774 | 4/1963 | Liang | 192/44 |
| 3,476,226 | 11/1969 | Massey | 192/27 |
| 3,487,900 | 1/1970 | Dahl | 192/27 X |
| 3,586,143 | 6/1971 | Hutchinson | 192/47 X |
| 4,284,183 | 8/1981 | Brisabois et al. | 192/48.92 |
| 4,499,980 | 2/1985 | Kaminski et al. | 192/35 |
| 4,995,489 | 2/1991 | Lederman et al. | 192/45 |
| 5,042,628 | 8/1991 | Malecha | 192/45 |

FOREIGN PATENT DOCUMENTS 487591 12/1953 Italy ................. 188/82.84

Primary Examiner—Leslie A. Braun
Assistant Examiner—David E. Henn
Attorney, Agent, or Firm—Patrick M. Griffin

[57] ABSTRACT

A shiftable roller clutch to replace the standard disk pack clutch in an automatic transmission is specifically designed to act cooperatively with the planet carrier, and to occupy a minimum of axial space within the transmission housing. The cage pilots on the outer surface of the cam race as it is shifted back and forth, and the actuator that moves the cage is axially aligned with the cam race, so that the total axial space taken up is minimized. The cam race also pilots on part of the planet carrier so as to maintain its concentricity therefrom.

2 Claims, 6 Drawing Sheets

SHIFTABLE ROLLER CLUTCH

This invention relates to overrunning roller clutches in general, and specifically to a shiftable roller clutch of compact and simple design that can replace a conventional disk pack clutch in an automatic transmission.

BACKGROUND OF THE INVENTION

Vehicle automatic transmissions include one or more gear sets, consisting of an inner sun gear, intermediate planet gears and their carrier, and outer ring gear. Various components of the gear set are held or powered to change the gear ratio. Reverse gear is provided by holding the planet carrier stationary relative to the transmission housing. When the sun gear is powered, the planet gears act as idlers, spinning around their own axes, but not traveling. Consequently, the ring gear turns in reverse. Another consequence of grounding the planet carrier is the familiar "lug down" feeling experienced in reverse when the driver lets up on the accelerator.

The most common commercially applied holding mechanism is the disk pack clutch. An interleaved set of plates and friction disks normally turn past one another without contact, bathed in a continual flow of lubricant. Upon a signal for gear change, a piston pushes the plates and friction disks together. While they work well and reliably, typical disk pack clutches occupy a good deal of axial room, and are heavy, with a large number of components.

Another known holding mechanism is a shiftable one way roller clutch, which can be used in place of the typical disk pack clutch. By shiftable, it is meant that the roller clutch can be selectively disabled, preventing it from locking up in either direction. When activated, it can prevent the planet carrier from turning relatively to the transmission housing in the one relative direction that the sun gear could otherwise cause it to rotate. This has the same net effect as the disk pack clutch, as far as creating reverse gear. However, unlike the disk pack clutch, when the accelerator is eased, the planet carrier can effectively overrun the transmission housing in the other direction, preventing lug down.

An example of a roller clutch designed for such an application may be found in U.S. Pat. No. 3,054,488 to General et al. The overrunning clutch disclosed there is a leg type roller clutch, with an outer cam race that pilots on an inner pathway. The mechanism that shifts the rollers is a phasing ring that carries a series of so called pawls, one for each roller, which extend axially in between the races. When the phasing ring is twisted back and forth, the pawls push the rollers back and forth, in or out of the cam wedges, enabling and disenabling the clutch. The phasing ring is described as being shifted by pressurized fluid that is pumped through passages drilled through the outer race and into the space between the races. No means for actually pumping in and withdrawing the fluid pressure is disclosed, however. So, while the general concept of a shiftable one way clutch to replace a disk pack in an automatic transmission is disclosed per se, a practical means of in fact incorporating it into the transmission and positively shifting it is not disclosed. The system apparently never achieved actual, commercial application.

SUMMARY OF THE INVENTION

The invention discloses a shiftable overrunning roller clutch for use in an automatic transmission that has a practical construction and operation. It is disclosed specifically for locking a planet carrier to a transmission housing to create reverse, and is specially designed to serve that purpose within a compact space. The transmission environment disclosed has an outer stationary housing with a central axis. An inner sun gear and outer ring gear are separated by an intermediate planet gear carrier. The overrunning roller clutch of the invention is located next to the planet carrier, radially between a special extension of the planet carrier and the inner surface of the transmission housing.

In the preferred embodiment disclosed, the roller clutch has an outer cam race and an inner pathway race. The cam race has an evenly spaced series of cam ramps that face a coaxial pathway race. The pathway race is splined to the planet carrier extension, while the cam race is splined to the inner surface of the housing. Therefore, when the races are locked together, the planet carrier will be effectively grounded to the transmission housing, creating reverse. When the races are prevented from locking up, the planet carrier operates as it normally would in the forward gears.

A specially designed cage can be shifted so as to deactivate the clutch. The cage, which is a one-piece, integrally molded structure, has an annular side plate that abuts an end face of the outer cam race and a plurality of evenly spaced pairs of crossbars that extend axially into the space between the races. Each pair of crossbars borders a cam ramp, with a roller and energizing spring pair between. When the cage is twisted into a deactivated position relative to the cam race, one crossbar of each pair pushes each roller far enough up its cam ramp so that it cannot jam between the races. The overrunning clutch, therefore, can not lockup in either direction. When the cage is shifted in the other direction to an activated position, the rollers are released so as to be able to wedge and lockup normally.

The cage also has a cylindrical guide flange that extends axially inwardly from the side plate over a cylindrical guide surface of the outer race. Ribs at the end of the guide flange snap fit into a circular groove. Therefore, the cage is axially retained to the outer race, and the groove and guide surface together provide a track that keeps the cage concentric as it is twisted back and forth. To actually shift the clutch, a piston is hooked between the cage and the inner surface of the transmission, in axial alignment with the clutch races. The piston retracts and extends in response to a control signal calling for forward or reverse respectively. Since the cam race cannot turn relative to the transmission housing, the net result is that the cage is twisted back and forth on the cam race in a positive and predictable manner. The entire configuration is axially compact, since only the cage side plate, which is relatively thin, occupies axial space outside of the races themselves. A good deal of axial space is saved compared to a conventional disk pack clutch.

It is, therefore, an object of the invention to provide a sure acting, shiftable overrunning roller clutch to create reverse gear in a vehicle automatic transmission.

It is another object of the invention to provide a roller clutch with a shiftable cage that is specially designed to retain itself to, and guide itself from, the cam race, so that it can be securely and positively shifted by a piston actuator.

It is another object of the invention to provide such a roller clutch that occupies a minimum of axial space.

DESCRIPTION OF THE PREFERRED EMBODIMENT

These and other objects and features of the invention will appear from the following written description, and from the drawings, in which.

Figure 1:
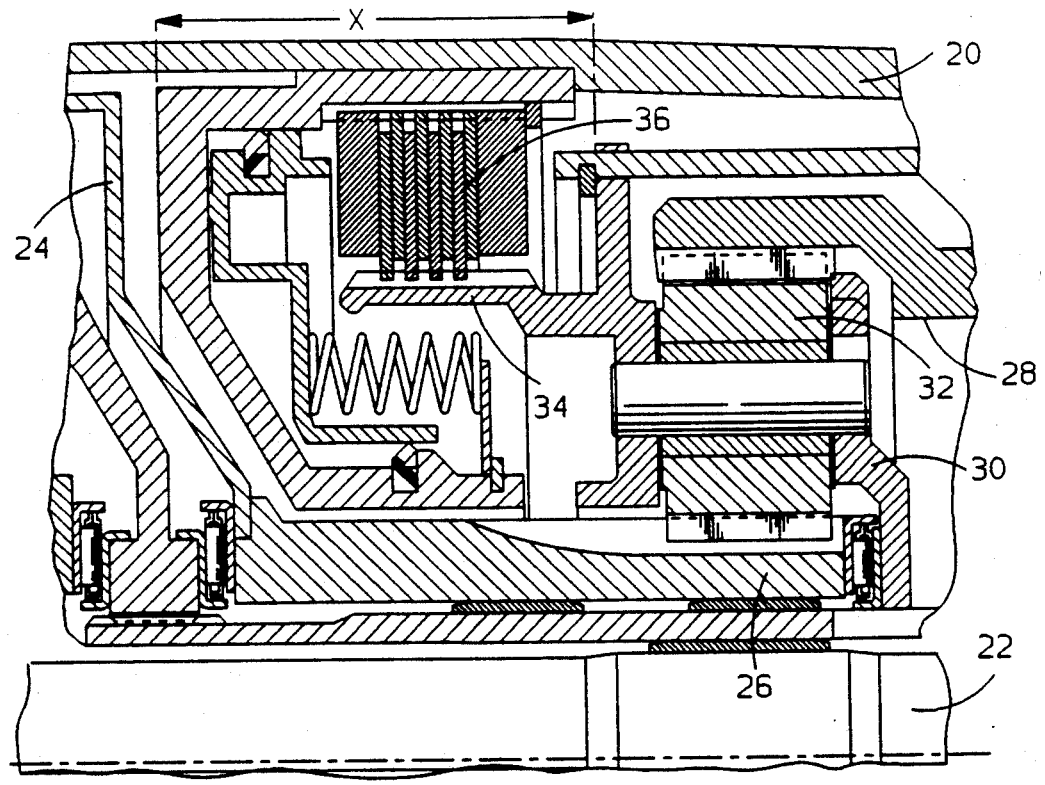
FIG. 1 is a cross section of a portion of a vehicle automatic transmission showing a gear set in a typical disk pack clutch used to create reverse gear.

Referring first to FIG. 1, a typical vehicle automatic transmission includes a solid housing 20 that is rigidly joined to the vehicle body, and which provides the structural framework for the other transmission components. A solid output shaft 22 runs through housing 20 along the dotted line central axis and ultimately to a standard differential, not illustrated. Engine torque reaches the transmission through a series of other standard components, the only one of which represented here is a cylindrical drum 24. Drum 24 is powered when a disk pack clutch located farther to the left is activated. A standard gear set includes an inner sun gear 26 fixed to the input drum 24, an outer ring gear 28, and a planet carrier between the two, indicated generally at 30. Planet carrier 30 holds several planet gears 32 that rotate relative to it, and has a splined cylindrical extension 34 located outside of the pitch circle of the planet gears 32. Planet carrier 30 is maintained solidly and securely coaxial within housing 20 by a bearing not fully visible in FIG. 1, and can revolve as a unit, besides supporting planet gears 32 for rotation. A standard, piston operated disk pack clutch 36 is splined to extension 34. When reverse is called for, disk pack clutch 36 holds the planet carrier 30 fixed relative to housing 20. Consequently, when the sun gear 26 is powered, the planet gears 32 act as idler gears. Ring gear 28 is powered in a reverse direction, which turns the output shaft 22, differential, and vehicle wheels in reverse. A consequence of the fact that planet carrier 30 is held fast within housing 20, unable to turn in either direction, is that when the engine slows and the vehicle wheels attempt to back drive the engine through the output shaft 22, the engine acts as a brake. This is reflected in the familiar "lug down" response experienced by the driver in reverse. A less visible feature of the standard disk pack clutch 36 is the axial room X that it occupies within the housing 20. This necessitates the large offset stamped into the drum 24.

Figure 2:
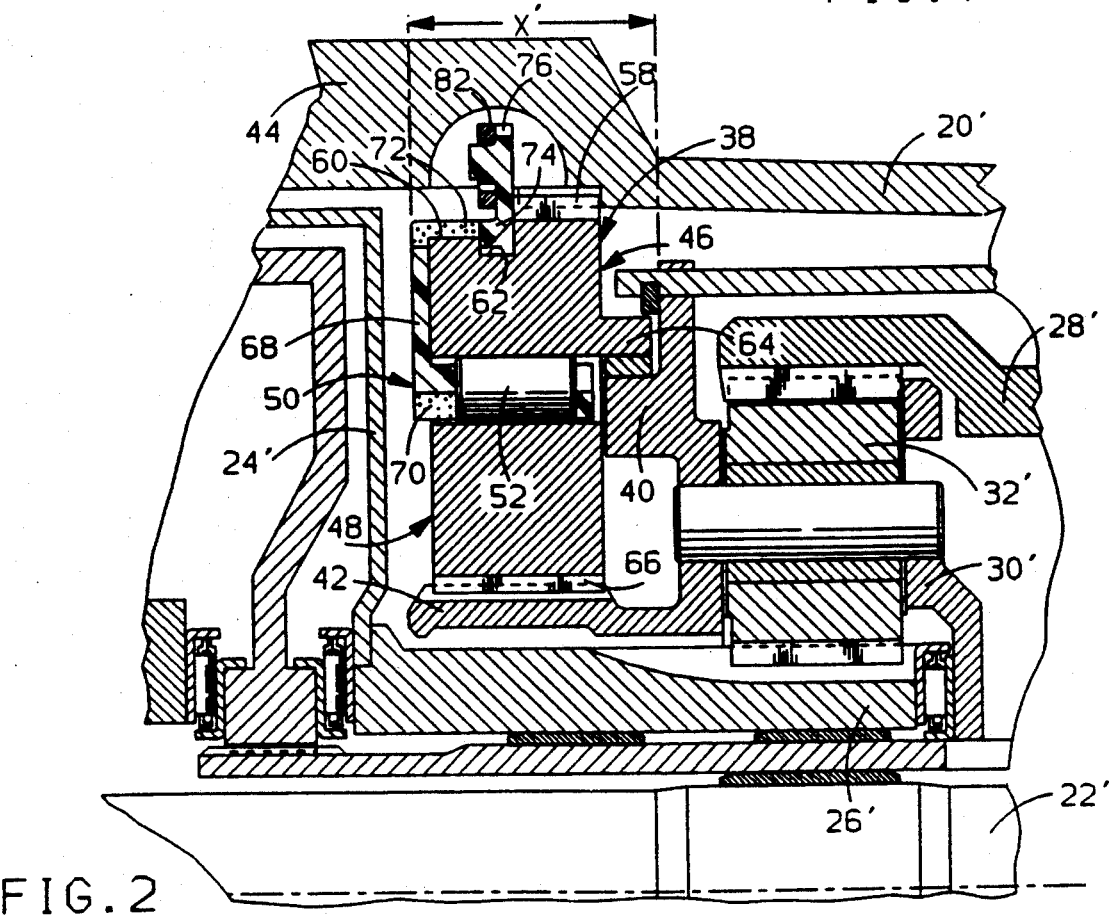
FIG. 2 is a view of a comparable portion of an automatic transmission incorporating a preferred embodiment of the invention.

Referring next to FIG. 2, a preferred embodiment of the overrunning roller clutch of the invention, indicated generally at 38, replaces disk pack clutch 36, within a much smaller axial space X'. The transmission environment is basically the same, and similar components are given the same number primed. It will be noted, however, that the drum 24' no longer has the large offset stamped into its shape, a consequence of the improved axial compactness. There are other modifications that accommodate roller clutch 38. Planet carrier 30' has a short bearing guide flange 40 coaxial to the central axis of housing 20', located outside the pitch circle of the planet gears 32', and a concentric splined cylindrical extension 42 located inside the pitch circle of the planet gears 32'. Housing 20' has a bulged wall section that provides a localized clearance channel 44, creating room for a component described below. Basically, however, the environment in which roller clutch 38 operates is the same.

Figure 3:
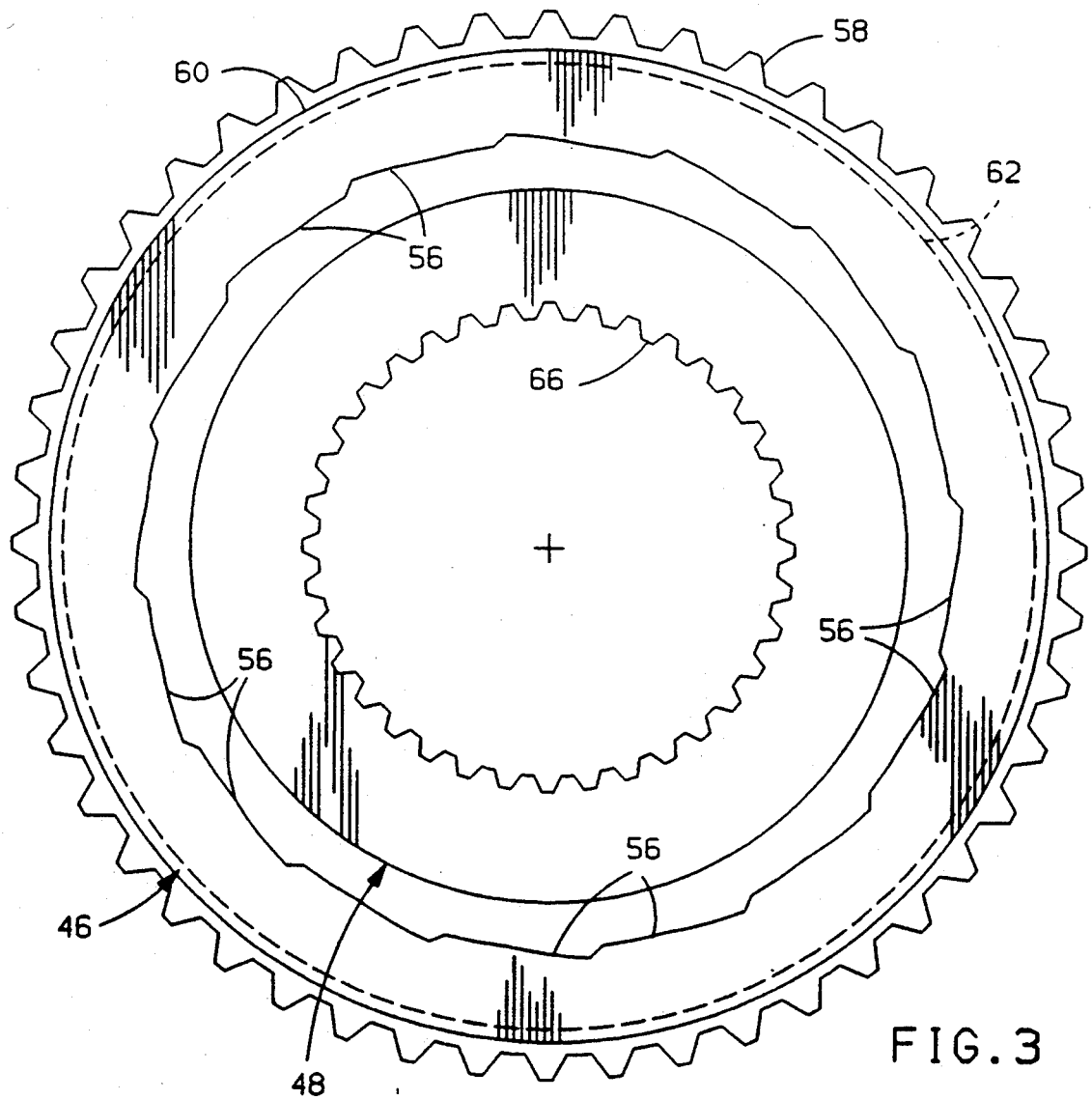
FIG. 3 is an axial view of just the clutch races.
Figure 4:
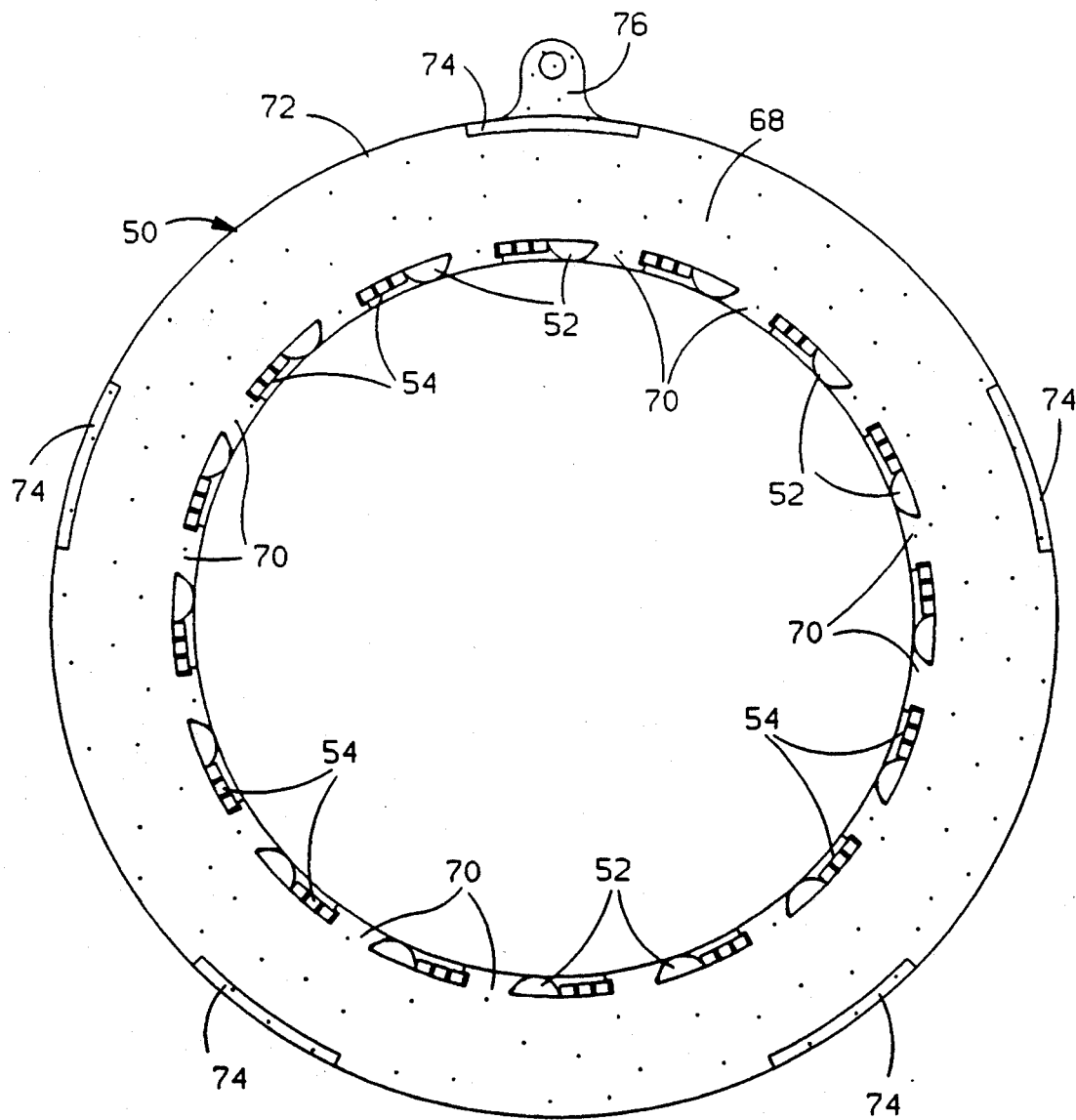
FIG. 4 is an axial view of a subasssembly of the cage, rollers and springs.
Figure 8:
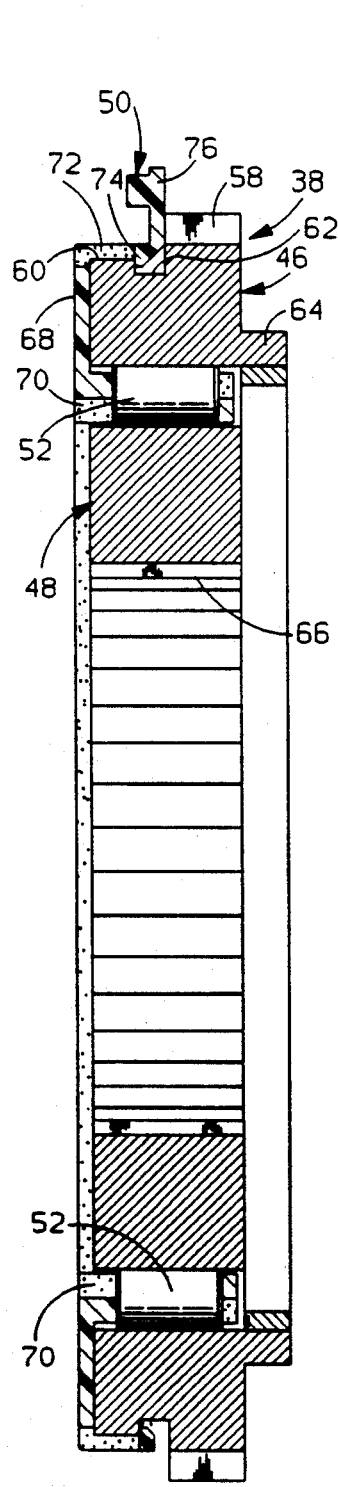
FIG. 8 is a cross sectional view of the completed roller clutch apart from the transmission.

Referring next to FIGS. 3, 4 and 8, the basic components of clutch 38 are an annular outer cam race 46, a concentric annular inner pathway race 48, and a cage 50 that fits in the annular space between the races 46 and 48. Cage 50, described in detail below, contains a plurality of paired cylindrical wedging rollers 52 and energizing springs 54. The races 46 and 48 must be at least as thick in the axial direction, measured between their end faces, as the rollers 52 are long. They are generally a bit thicker, so as to provide sheltering room for the cage, but roller clutch 38 is specially designed so as to occupy essentially only that minimally necessary axial space. Cam race 46 has conventional inner surface comprised of an evenly circumferentially spaced series of sloped cam ramps 56. The outer surface of cam race 46 is uniquely configured to cooperate with cage 50. Whereas the outer surface would normally be a simple cylinder, here it is comprised of a splined portion 58 on one side, a smaller diameter smooth cylindrical guide surface 60 on the other, and an intermediate circular groove 62. A cylindrical bearing 64 extends from the right end face, best seen in FIG. 8, while the left end face is flat. Pathway race is basically conventional, with a splined inner surface 66.

Figure 5:
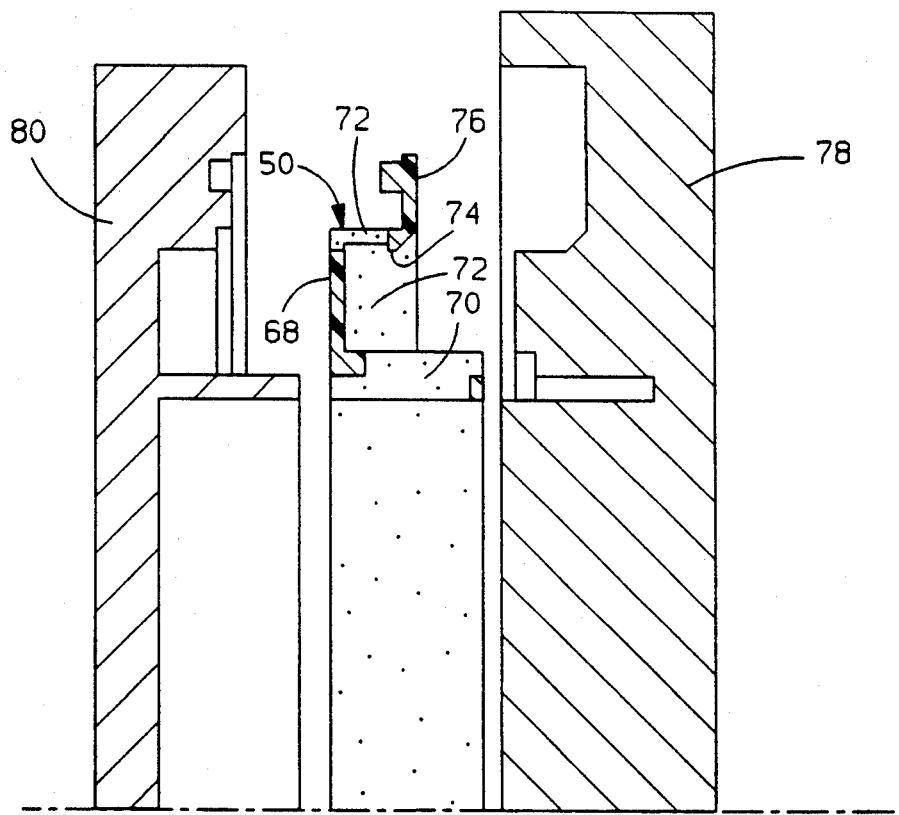
FIG. 5 is a cross sectional view of the cage alone between the molds that form it.
Figure 6:
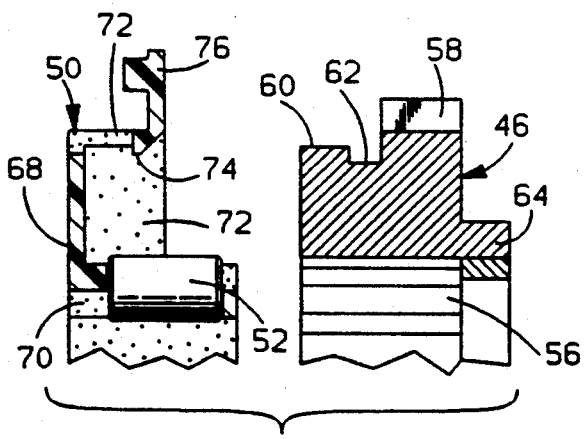
FIG. 6 is a cross sectional view of the subassembly of FIG. 4 aligned with the cam race.

Referring next to FIGS. 4, 5 and 6, details of cage 50 may be seen. Cage 50 is integrally molded of a suitable plastic, such as fiber filled nylon. Its main structural foundation is an annular side plate 68 that is sized so as to closely abut the left end face of cam race 46. Extending axially inwardly from the inner diameter of side plate 68 are a plurality of crossbars 70. Adjacent pairs of the crossbars 70 are spaced apart by about the length of a cam ramp 56, and are thin enough to fit between the races 46 and 48 with some radial clearance. Extending axially inwardly from the outer diameter of side plate 68 is a cylindrical guide flange 72 that has the same diameter as guide surface 60. Five evenly spaced ribs 74 extend radially in from the edge of guide flange 72. A tab 76 extends radially out from the edge of guide flange 72 near one rib 74. The shape of cage 50 is specifically designed to be bypass molded, as shown in FIG. 5. All the external surfaces of cage 50 are arranged so as to have no mutual radial overlap or access blocking surface concavities. Consequently, the entire shape can be molded with only two axially parting mold halves, 78 and 80. Once cage 50 is completed, respective pairs of rollers 52 and springs can be biased between adjacent pairs of crossbars 70 to create the subassembly shown in FIG. 4.

Figure 7:
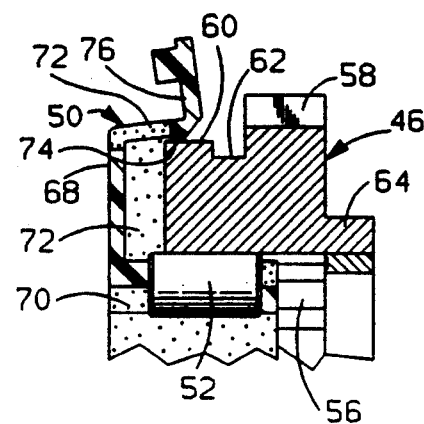
FIG. 7 is a view like 6, but showing the subassembly in the process of being installed to the cam race.

Referring next to FIGS. 2 and to FIGS. 6 through 8, the assembly and installation of clutch 38 are illustrated. First, as seen in FIGS. 6 and 7, cage 50 is aligned with cam race 46 and pushed toward it until the ribs 74 hit the edge of guide surface 60. Continued pushing of cage 50 flexes guide flange 72 outwardly as the ribs 74 slide axially along guide surface 60. Eventually, the ribs 74 snap into groove 62 and side plate 68 abuts the end face of cam race 46, as seen in FIG. 8. At that point, cage 50 is totally axially retained, and cannot move in either direction off of cam race 46. Likewise, it is totally radially constrained, since the cage guide flange 72 and ribs 74 serve as a track follower, piloting closely on and in the cam race guide surface 60 and groove 62. The fit is not so tight as to prevent easy twisting of the cage 50 back and forth on the cam race 46, however. To complete roller clutch 38, pathway race 48 is simultaneously pushed and twisted into place inside the complement of rollers 52, the so called "ringing in" process. The completed roller clutch 38 is installed by axially inserting it inside housing 20' as the transmission is built up. As clutch 38 is pushed in, tab 76 registers with localized channel 44, the cam race splines 68 slide into the inner surface of housing 20', bearing 64 moves closely over planet carrier guide flange 40, and the pathway race splines 66 slide into the planet carrier extension 42. Finally, a mechanical actuator, here a piston 82, is placed in channel 44 and hooked between tab 76 and the inside of housing 20'. Piston 82 is axially aligned with the groove 62, and is small enough in diameter that it occupies no more axial space than the cam race 46 already takes up. The rest of the transmission is then built up conventionally.

Figure 9:
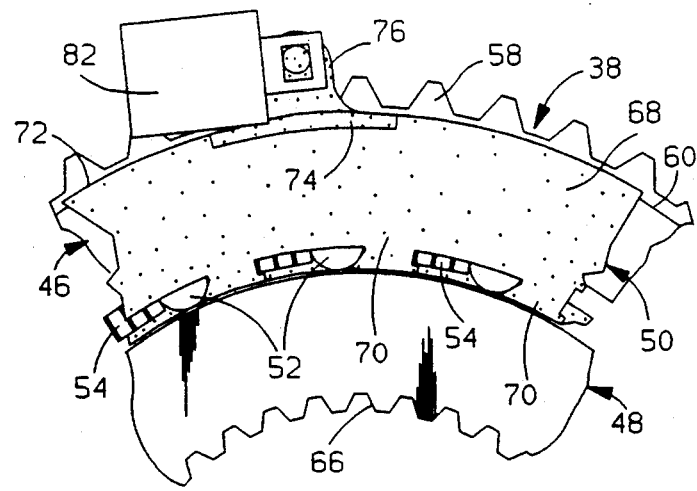
FIG. 9 is an axial view of a portion of the clutch shifted to its inactive state.
Figure 11:
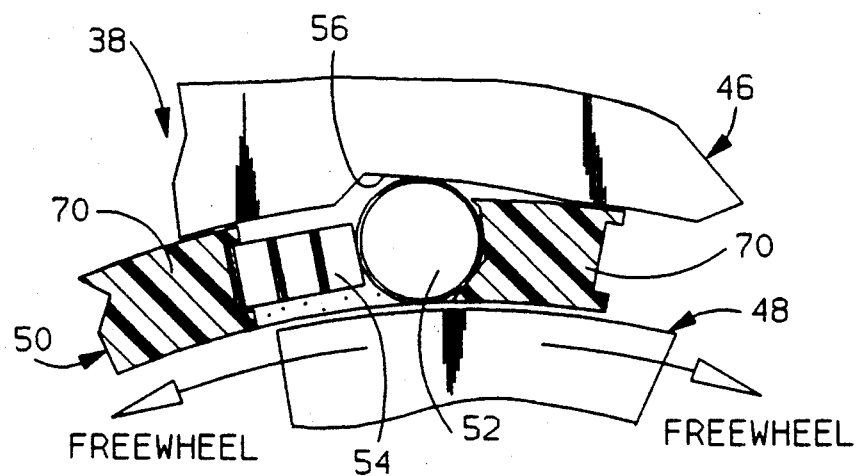
FIG. 11 is an axial view like FIG. 9, but with the cage side plate cut away to show the position of the rollers relative to the cam ramps.

Referring next to FIG. 2 and to FIGS. 9 and 11, the deactivated condition of clutch 38 is illustrated. With a conventional overrunning clutch, the cage would be fixed to the cam race, and the energizing springs would continually urge the wedging rollers toward a lockup ready position where they could quickly and automatically jam. Here, clutch 38 is normally deactivated, so that it cannot lockup. Cam race 46 is maintained coaxial to the central axis by its bearing 64, which pilots on the planet carrier guide flange 40. Consequently, the cage crossbars 70 need not perform any bearing or support function, and can be sized small enough to move freely between the races 46 and 48. This allows cage 50 to twist freely on cam race 46, guided by the close fit of guide flange 72 on the circular track created by guide surface 60 and groove 62. The relative angular position of the two is determined by actuator piston 82. Whenever the transmission was in a forward gear, or in neutral, piston 82 would receive a continuing signal from the vehicle's control system that would keep it retracted. When piston 82 is retracted, cage 50 is pulled and twisted counterclockwise relative to the stationary cam race 46. Those cage crossbars 70 that are adjacent to the rollers 52 push and maintain the rollers 52 far enough away from the narrow ends of the cam ramps 56 that they cannot jam between the races 46 and 48. Thus, the cage acts in opposition to the energizing springs 54, though they are not compressed. In the deactivated state, the races 46 and 48 freewheel in both directions, so that the planet carrier 30' operates as if clutch 38 were not present.

Figure 10:
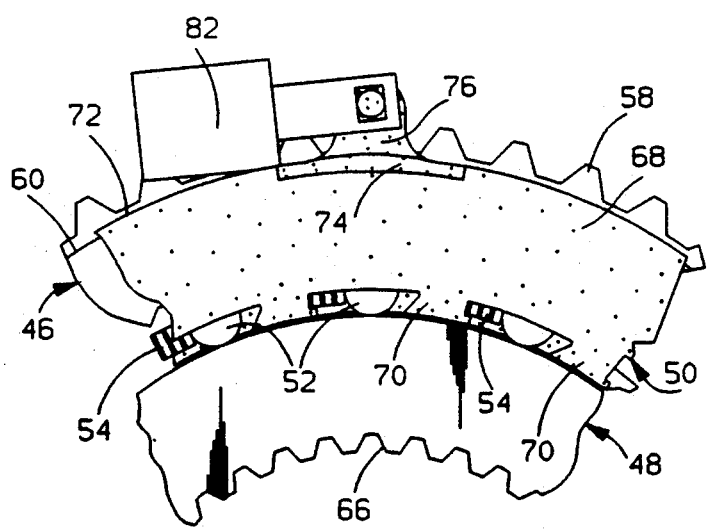
FIG. 10 is a view like FIG. 9, but showing the clutch shifted to its activated position.
Figure 12:
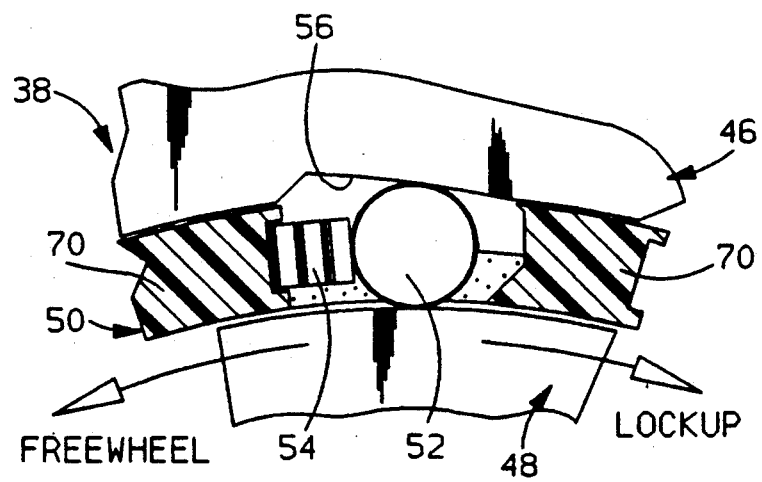
FIG. 12 is a view like FIG. 10, also with the side plate cut away.

Referring next to FIGS. 10 and 12, the activated condition of clutch 38 is illustrated. When the signal for reverse is received, piston 82 expands to the FIG. 10 position. Cage 50 is twisted clockwise on cam race 46 far enough that the crossbars 70 move out of registration with the cam ramps 56. The energizing springs 54 are recompressed and can again urge the rollers 52 continually toward the narrow end of the cam ramps 56, ready to jam between the races 46 and 48. Sun gear 26' is continually powered by drum 24' in the clockwise direction, and tends to rotate carrier 30' with it. Because of the splined extension 42, planet carrier 30' has to carry pathway race 48 with it in order to rotate clockwise. However, any force attempting to rotate pathway race 48 clockwise relative to the fixed cam race 46 jams the rollers 52 between the cam ramps 56 and the pathway race 48, locking up clutch 38. Carrier 30' is thus effectively held, grounded to transmission housing 20', just as the conventional disk pack clutch 36 would have done. Ring gear 28' is powered in reverse, as are the wheels. Unlike the disk pack clutch 36, however, when the driver backs off of the accelerator, the lug down response does not occur. When the engine power to drum 24' and sun gear 26' is reduced enough that the wheels attempt to back drive the engine through the ring gear 28', the wheel powered ring gear 28' can freely rotate the planet carrier 30' counterclockwise. This is because the pathway race 48 carries the rollers 52 toward the wide end of the cam ramps 56, and the clutch 38 freewheels. Consequently, engine braking of the ring gear 28' and wheels will not be experienced through the temporarily slower turning sun gear 26'. Clutch 38 locks up again once when the driver depresses the accelerator. When the driver shifts out of reverse, the piston 82 is signaled to contract and pull the rollers 52 back to the deactivated position.

Referring back to FIGS. 1 and 2, and considering the operation described above, the axial compactness of roller clutch 38 and piston 82 compared to disk pack clutch 36 can be better appreciated. There is an inevitable radial space R created by the presence of the planetary gear set. The strength of the races 46 and 48 is a function of their moment of inertia, which in turn is directly proportional to the axial thickness of the races, but proportional also to the cube of their radial width. Consequently, the designer can minimize the axial thickness of the races 46 and 48 with no real strength penalty by taking advantage of the readily available radial room R. Furthermore, the guidance of and shifting of cage 50 are provided by the outer surface of cam race 46 itself, and by the piston 82, which resides within the axial space already occupied by cam race 46. The cam race bearing 64 extends past the end face, but the guide flange 40 that it pilots on occupies no more axial space than did the old planet carrier extension 34. Likewise, the cage side plate 68 occupies little axial space. In general, then, clutch 38 is designed specifically to operate within a minimal axial space in cooperation with the planet carrier of a standard gear set.

Variations of the embodiment could be made. The cage could be made to twist on a different cam race guide track; for example, a circular groove machined into the end face of cam race 46. A two part cage could be devised with a collar that fit tightly over the cam race outer surface while the rest of the cage twisted back and forth on the collar, providing its own guide track, in effect. In either case, the guide track would effectively be on, or a part of the cam race, and therefore located basically within the axial space already taken up by the cam race. Such a cage collar could even interfit with the splines on the cam race, so that the separate guide surface 60 and groove 62 would not have to be machined into it. The one-piece cage disclosed is simpler to make, however, and the guide surface 60 and groove 62 can be machined without affecting the splines 58. As disclosed, the roller clutch 38 cooperates uniquely with the planet carrier 30' in that the cam race 46 pilots on the guide flange 40, maintaining its concentricity by taking advantage of structure that is already present. However, the clutch cage 50 could be reconfigured such that the cage crossbars 70 fit more closely between the cam race 46 and pathway race 48 to act as so-called journal blocks. In that case, the cam race 46 could take its concentricity directly from the inner pathway race 48, and only indirectly from the planet carrier 30'. Any expanding and contracting actuator could be used, so long as it fits into the space available and provided a secure, positive and repeatable stroke to twist the cage 50 back and forth. Therefore, it will be understood that it is not intended to limit the invention to just the embodiment disclosed.

The embodiments of the invention in which an exclusive property or privilege is claimed are defined as follows:

1. For use in a vehicle automatic transmission having a stationary housing with a central axis and a series of gear elements surrounding said central axis, a shiftable overrunning clutch for selectively holding and releasing one of said gear elements to said housing, comprising, an outer cam race having an inner surface comprised of a series of circumferentially spaced cam ramps and an outer surface fixed to said housing, said cam race also having a circular guide track coaxial to said central axis, an inner pathway race fixed to said one gear element and having a cylindrical pathway coaxial to said cam race cam ramps, a cage including a plurality of circumferentially spaced pairs of crossbars extending axially between said races, each pair bordering a respective cam ramp, and a track follower piloting closely on said guide track so as to support said cage to twist on said cam race, a plurality of wedging rollers and respective energizing spring pairs, each of which is located between a respective pair of cage crossbars, and, an actuator attached to said housing and cage and axially aligned with said guide track that is selectively retractable and extendible to twist said cage on said cam race between an deactivated position where one of each pair of cage crossbars blocks said rollers from jamming between said cam ramps and pathway race, allowing said clutch to freewheel in each direction, and an activated position where said energizing springs urge said rollers away from the other of each of said pair of crossbars into a lockup ready position to jam between said cam ramps and pathway race, whereby, said one gear element may be selectively held to and released from said transmission housing by extending and retracting said actuator while occupying substantially only the axial space within said housing occupied by said cam race.

2. For use in a vehicle automatic transmission having a stationary housing with a central axis and planet carrier supported within said housing for concentric rotation about said central axis, a shiftable overrunning clutch assembly for selectively holding and releasing said planet carrier to and from said housing, comprising, a cylindrical bearing guide flange on said planet carrier that is coaxial to said central axis, an outer cam race having an inner surface comprised of a series of circumferentially spaced cam ramps and an outer surface fixed to said housing, said cam race also having a circular guide track coaxial to said central axis and a cylindrical bearing piloted on said carrier bearing guide flange, an inner pathway race fixed to said one gear element and having a cylindrical pathway coaxial to said cam race cam ramps, a cage including a plurality of circumferentially spaced pairs of crossbars extending axially between said races, each pair bordering a respective cam ramp, and a track follower piloting closely on said guide track so as to support said cage to twist on said cam race, a plurality of wedging rollers and respective energizing spring pairs, each of which is located between a respective pair of cage crossbars, and, an actuator attached to said housing and cage and axially aligned with said guide track that is selectively retractable and extendible to twist said cage on said cam race between an deactivated position where one of each pair of cage crossbars blocks said rollers from jamming between said cam ramps and pathway race, allowing said clutch to freewheel in each direction as said cam race is maintained coaxial by said planet carrier bearing guide flange, and an activated position where said energizing springs urge said rollers away from the other of each of said pair of crossbars into a lockup ready position to jam between said cam ramps and pathway race, whereby, said planet carrier may be selectively held to and released from said transmission housing by extending and retracting said actuator while occupying substantially only the axial space within said housing occupied by said cam race.

* * * * *